Dec. 25, 1928. 1,696,399
O. H. HANSEN
PROCESS OF AND APPARATUS FOR TREATING FRUIT
Filed Jan. 26, 1925
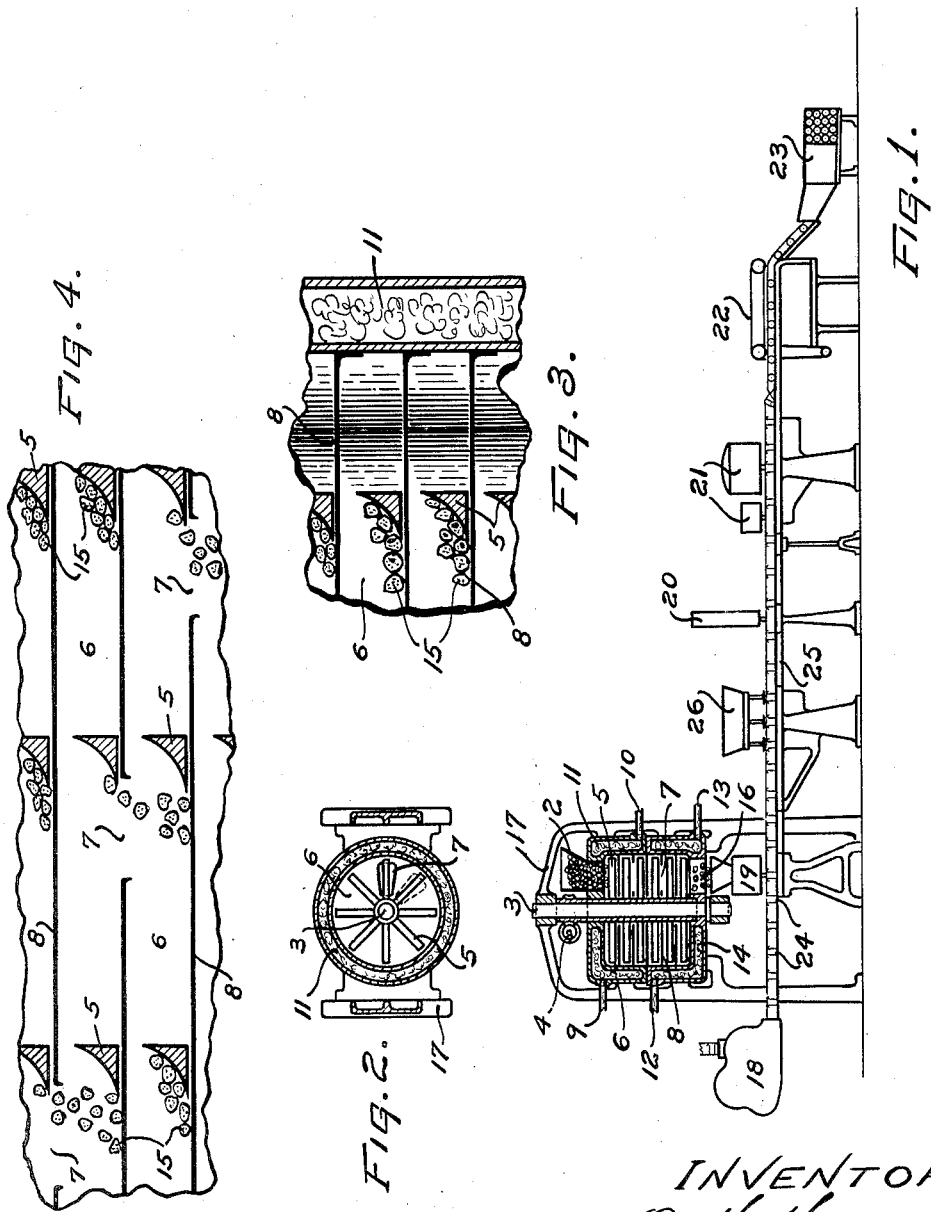
INVENTOR-
O. H. Hansen
BY W. H. Lieber
ATTORNEY.

Patented Dec. 25, 1928.

1,696,399

UNITED STATES PATENT OFFICE.

OSWALD H. HANSEN, OF PORT WASHINGTON, WISCONSIN, ASSIGNOR TO HANSEN CANNING MACHINERY CORPORATION, OF CEDARBURG, WISCONSIN, A CORPORATION OF WISCONSIN.

PROCESS OF AND APPARATUS FOR TREATING FRUIT.

Application filed January 26, 1925. Serial No. 4,968.

This invention relates generally to improvements in the art of conditioning and packing certain kinds of edible commodities in order to preserve the same, and relates more specifically to an improved process of and apparatus for exhausting, sterilizing, cooking, packing and otherwise treating fruits or similar substances.

An object of the invention is to provide a new and useful process of treating and packing fruits or the like. Another object of the invention is to provide simple and efficient apparatus for enabling practical and effective exploitation of the improved method.

It is at present common commercial practice in the canning industry, to pack acid bearing fruits such as strawberries and cherries, by initially cleaning and otherwise treating the berries to remove unwholesome parts, by subsequently placing measured batches of the fruit mixed with syrup in receptacles, by subsequently heating the filled containers in order to exhaust the gases from the product, by subsequently closing and sealing the cans to confine the exhausted mixture, and by finally sterilizing and cooking the confined material. When the product contains acid, the exhausting operation has a double purpose, namely, to prevent pin-holing by expelling gases which are apt to produce such action, and to cause the product when sealed to produce a partial vacuum in the cans. It is practically impossible with the prior process, to effectively release and expel the gases during the exhausting operation, because of the fact that each batch of mixture constitutes a relatively thick mass and that it requires excessive heating of the exterior of these masses in order to insure sufficient heating of the inner portions thereof. It has also been discovered that sudden excessive heating of fruit during exhausting, has a "killing" effect whereby free escape of the confined gases is positively prevented. For these reasons it is impossible to effect uniform and efficient treatment of fruit by the prior methods of conditioning.

The present improvement contemplates provision of a new methods of conditioning and of subsequently packing fruits or the like, whereby the berries may be effectively exhausted, sterilized and cooked prior to being placed in the containers. In accordance with the invention, the product is preferably slowly and uniformly treated during the exhausting operation, in a relatively dry condition and in thin layers, being simultaneously gently agitated in order to insure effective and like treatment of every particle. After the fruit has been properly finally conditioned it is placed in sterilized receptacles whereupon sterilized and heated syrup is added thus submerging the berries. Sterilized covers are subsequently applied after which the material is permitted to cool thereby producing a partial vacuum in each of the sealed containers. The fruit thus treated and packed is free from destructive gases and pin-holing or other spoilage is positively eliminated.

The improved apparatus for effecting commercial exploitation of the new process, is adapted to function automatically, carrying on the successive steps in logical order and continuously treating the fruit delivered thereto either continuously or in intermittent batches. As the apparatus is subject to considerable modification as to details of construction, no attempt has been made to disclose the minor structural details.

These and other objects and advantages attainable with the present invention will be apparent from the accompanying specification.

The feature of sterilizing any kind of edible substance prior to packing the same in receptacles, as well as other novel features of processes of and apparatus for effecting treatment of such materials, specifically described and otherwise disclosed but not claimed herein, form the subject of copending applications Serial No. 728,572, filed July 28, 1924; Serial No. 741,212, filed October 2, 1924; and Serial No. 747,539, filed November 3, 1924.

A clear conception of the several steps of the improved process and of the details of construction of one embodiment of apparatus for effecting commercial exploitation of the process, may be had by referring to the drawing accompanying and forming a part of this specification in which like reference characters designate the same or similar parts in the various views.

Fig. 1 is a complete diagram of one assemblage of apparatus for effecting commercial exploitation of the improved process of treating fruit.

Fig. 2 is a diagrammatic horizontal section through the fruit exhausting and sterilizing apparatus.

Fig. 3 is a fragmentary enlarged diagrammatic vertical irregular section through the fruit exhausting and sterilizing apparatus, a part of the section being taken perpendicularly across the agitating and conveying arms, and another part thereof being taken radially through the heating jacket.

Fig. 4 is an enlarged diagrammatic developed section taken vertically through a fragment of several of the treating chambers of the fruit exhausting and sterilizing apparatus.

The apparatus specifically illustrated, for effecting exploitation of the new process, comprises in general, mechanism for automatically exhausting, sterilizing and otherwise treating the fruit berries 15 alone; a measuring and feeding device 19 arranged to receive the warm conditioned berries 15 from the treating mechanism and adapted to deliver measured batches of the berries to successive cans or receptacles 24; a can washer 18 for automatically cleaning and sterilizing the receptacles 24 in succession; a syruper 26 for automatically delivering sterilized and heated syrup to the successive receptacles 24 after the berries 15 have been deposited therein; a cover feeder 20 for placing sterilized covers upon the successive filled receptacles 24; a closing machine 21 for automatically attaching the covers to the successive filled receptacles; a labeling machine 22 for automatically applying labels to the successive sealed receptacles; a boxing device 23 for placing the finished cans or receptacles in suitable containers; and an automatic conveyor 25 for advancing the receptacles 24 from one machine to another.

The improved mechanism for automatically exhausting, sterilizing and cooking the fruit berries 15 consists of a plurality of superposed treating chambers 6 surrounded by upper and lower heating jackets 11, 14 respectively. The several treating chambers 6 are separated by horizontal shelves or plates 8 each of which has a discharge opening 7 therein. The discharge openings 7 of the several chambers 6 are staggered with respect to each other as shown in Fig. 4. A supply hopper 2 communicates with the upper chamber 6, and a final delivery opening 16 communicating with the lower chamber 6 is adapted to deliver the treated berries directly to the measuring and feeding device 19. The upper heating jacket 11 is provided with a steam inlet 9 and an outlet 10, while the lower jacket 14 is provided with a similar inlet 12 and an outlet 13. The jackets 11, 14 are preferably separated by a dividing wall so that they may be provided with heating medium of different temperature.

Located centrally within the treating chambers 6 is a stationary shaft 3 supported in vertical position by a frame 17 which also supports the chambers 6 and the jackets 11, 14. A rotary sleeve which is journaled upon the shaft 3 carries a series of radially disposed agitating and conveying arms 5 within each chamber 6, the arm supporting sleeve being slowly rotatable by means of worm gearing 4. The arms 5 are formed to gradually urge the fruit berries along the plates 8 as shown in Figs. 3 and 4, and to simultaneously roll the berries in order to expose all portions thereof to the heat.

During normal operation of the apparatus in order to effect exploitation of the improved process, the previously cleaned fruit berries 15 are delivered into the supply hopper 2 in any convenient manner and the arms 5 are revolved through the chambers 6 from right to left as viewed in Fig. 4. Steam or other heating medium at relatively low temperature is admitted to the upper jacket 11, and similar heating medium at considerably higher temperature is admitted to the lower jacket 14. The berries 15 delivered by gravity into the upper chamber 6 from the hopper 2, are urged and tumbled along the upper plate 8 by the revolving arms 5 until they reach the first discharge opening 7 whereupon they are delivered by gravity into the chamber 6 directly below. In the second chamber 6 the berries 15 are likewise urged and tumbled along the floor plate 8 by the arms 5 revolving in this chamber, until they are eventually discharged through the second discharge opening 7 to the next chamber 6 below. In this manner the berries 15 automatically and gradually conveyed through the successive chambers 6 are effectively subjected to the heat applied from the jackets 11, 14. By virtue of the relatively low and gradually applied heat in the three upper treating chambers 6, effective exhausting of the gases and sterilization of the fruit berries 15 are simultaneously effected. By virtue of the higher temperature existing in the three lower chambers 6, the previously exhausted and sterilized berries 15 passing through these chambers are effectively finally cooked and otherwise conditioned and are eventually discharged through the final delivery opening 16 to the measuring and feeding device 19.

The measuring and feeding device 19 automatically measures batches of the conditioned fruit berries 15 and delivers a measured quantity thereof to each of the successive sterilized receptacles 24 received from the combined sterilizer and washer 18. The receptacles 24 after receiving the berries 15 are quickly transported by the conveyor 25 to the syruper 26 wherein the berries are immersed in sterilized heated liquid. The successive receptacles 24 filled with mixture of berries 15 and syrup are subsequently provided with sterilized caps by the feeder 20 after which they are quickly sealed in the closing machine 21, while the mixture is still in relatively hot condition. The finally sealed and filled receptacles 24 are subsequently transported through the labeling machine 22 to the boxing machine 23, the product being relatively cool when finally packed for shipment.

It will be apparent that by properly controlling the degree of heat applied and the speed of movement of the arms 5, in the conditioning apparatus, any desired rate of treatment may be obtained. The arms 5 slowly urge the berries 15 along the plates 8 without damaging the berries and insure effective treatment of the fruit by tumbling and gently agitating the product. By sealing the filled receptacles while the mixture is still hot, the desired condition of partial vacuum in each receptacle 24 is automatically obtained as the confined product cools. In this manner, effective exhausting, sterilizing and cooking is assured and pin-holing as well as other spoilage is positively eliminated.

It should be understood that it is not desired to limit the invention to the exact steps of the process or to the precise details of construction of the apparatus herein disclosed, for various modifications within the scope of the claims may occur to persons skilled in the art.

It is claimed and desired to secure by Letters Patent:—

1. In combination, a plurality of superposed plates forming a series of treating chambers, conveyor arms movable within each of said chambers, means for delivering fruit to and from said chambers in succession, and means for heating said chambers.

2. In combination, a plurality of superposed plates having staggered openings therein, conveyor arms revoluble closely adjacent to each of said plates and over said openings, and means for applying heat to the spaces above said plates.

3. In combination, a plurality of superposed plates having staggered discharge openings therein and forming a series of treating chambers, means for supplying fruit to the upper of said chambers, means for discharging treated fruit from the lower of said chambers, a plurality of radial conveyor arms movable through each of said chambers, and means for applying variable degrees of heat to different chambers of said series.

4. In combination, means forming a series of chambers, means for heating said chambers, means for delivering fruit berries in bulk to and from said chambers in succession, and means within each of said chambers for gradually rolling the fruit berries therethrough.

5. In combination, means forming a series of superposed chambers, means for heating said chambers, means for delivering fruit berries in bulk to the upper of said chambers, means within said chambers for gradually rolling the fruit berries therethrough and for delivering said berries to a succeeding chamber, and means for delivering the treated fruit berries from the lower of said chambers.

6. The process of treating fruit, which comprises, simultaneously rolling the fruit berries over successive surfaces confined within a succession of chambers and applying gradually increasing heat to the berries while rolling over the several surfaces.

7. The process of treating fruit, which comprises, rolling the fruit berries over successive surfaces confined within a succession of chambers and applying gradually increasing heat to the berries while rolling over the several surfaces, and subsequently immersing the heated berries in hot syrup.

8. The process of treating fruit, which comprises, simultaneously rolling a limited number of the fruit berries along a surface in a confined chamber and applying heat thereto, subsequently rolling a limited number of the berries along another surface in a confined chamber and applying higher temperatures, and finally cooling the berries.

9. The process of treating fruit, which comprises, simultaneously rolling a limited number of the fruit berries along a surface in a confined chamber and applying heat thereto, subsequently rolling a limited number of the berries along another surface in a confined chamber and simultaneously applying higher temperature, and finally immersing the heated berries in hot syrup.

In testimony whereof, the signature of the inventor is affixed hereto.

OSWALD H. HANSEN.